W. H. Horstmann.
Electrical Conductor.
No. 1,342. Reissued Sept. 9, 1862.
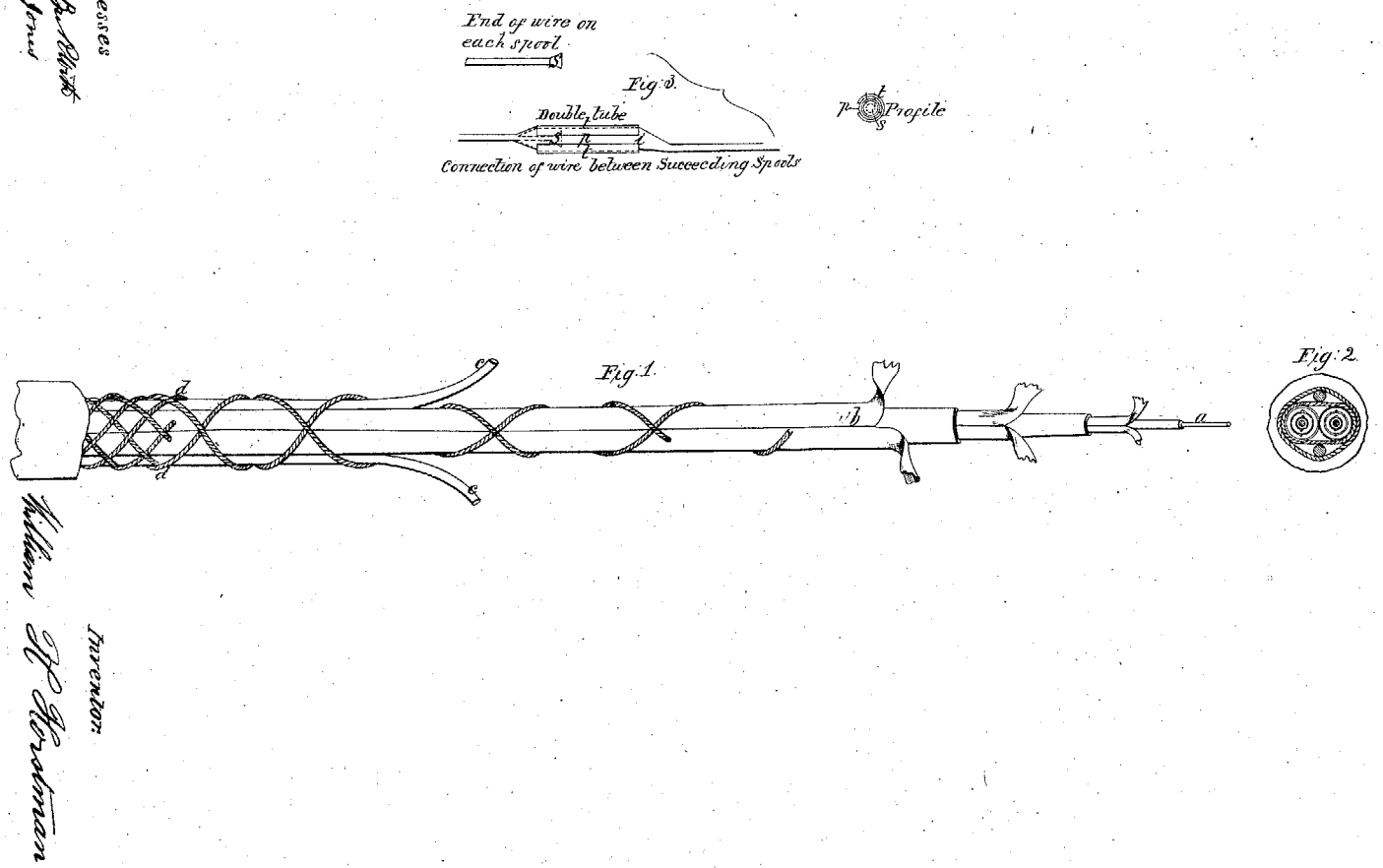
Witnesses
J. Bartlett
A. Jones
Inventor
William H. Horstman

UNITED STATES PATENT OFFICE.

WILLIAM H. HORSTMANN, OF BROOKLYN, NEW YORK.

IMPROVEMENT IN SUBMARINE CABLES FOR TELEGRAPHS.

Specification forming part of Letters Patent No. 25,414, dated September 13, 1859; Reissue No. 1,342, dated September 9, 1862.

*To all whom it may concern:*

Be it known that I, WILLIAM H. HORSTMANN, of Brooklyn, in the county of Kings and State of New York, have invented certain new and useful Improvements in the Construction of Cables for Telegraphic Purposes, for which I obtained Letters Patent of the United States the 13th day of September, 1859, and which I have now divided for the purpose of reissue in two separate Letters Patent; and I do herein describe that portion of my said invention and specifically ascertain the same which I desire to secure by these presents.

In the drawings, Figure 1 is a longitudinal enlarged view of my cable partly formed; Fig. 2, cross-section of the partially-formed cable; Fig. 3, new mode of joining the conductors.

My improvement is in the new mode of constructing the cable. To effect this I take any good conducting-wire, thoroughly cleaned by any process, and coat the same with a non-conductor, for which purpose gum-lac I prefer; but other non-conductors may be substituted, such as are well known. This I cover with a coating of fibrous material saturated and covered with one or more of the following ingredients, viz: tar, pitch, rosin, gutta-percha, or india-rubber. This forms a thick coating over the interior insulator and protects it from injury, and affords an additional security against the permeation of the surrounding water in which it is submerged, after which a coating of gum-lac may be added for greater security; or this last may be omitted. One or more strands thus insulated may be wound or wrapped with fibrous material, such as hemp, cotton cloth, cord, &c., which will cover and protect the interior and hold all together. This insulated incipient cable of one or more conductors, *a*, has any suitable number of iron wires, *c*, laid over the coating *b*, above described, in straight line parallel with the axis of the cable. These iron wires are intended to bear the strain of the cable while being laid and protect the conductor or conductors from rupture or injury. They therefore run straight and parallel with the conductor, and not spirally around it, while by the interposition of the thick fibrous coating between these wires and the conductor sufficient elasticity and flexibility are maintained, which is effected by a cheap and inexpensive insulating material, as pitch or asphaltum. These wires are bound to the core or interior cable by any suitable bands passing spirally around the whole, as seen at *d*, after which the cable may receive an additional coating of pitch or tar with or without fibrous material.

In order to connect several lengths of wire, I employ a tubular link, *r*, (shown in Fig. 3,) having at each end a conical hole, through which a strand of wire is put and upset, so as to form a conical head, as at *s*. This strand end and link form a swivel-joint, and, the wire head and socket being conical, they fit so as to bring the metal closely in contact. The link can be soldered to one of the ends of wire that are to be joined by it, and the other conical end of wire can be inserted into the conical recess through a slit in the link cut in one side thereof, as seen by the dotted lines at *s*, and a thin covering-ring, *t*, with a similar slit or opening in it, as clearly seen in Fig. 3, which surrounds the link. This slit is, when the end of wire is inserted, turned opposite the slit in the link, after which it is revolved around so as to bring the slit in the cover away from the slit in the link, as seen in the Fig. 3, which confines the end in place.

Having thus fully described my improvements in constructing cables, what I claim in this part of my reissued Letters Patent is—

1. The combination of a conductor insulated and then covered with a fibrous coating material to form an elastic bed for the outer wires, substantially as herein described, combined with exterior wire or wires laid parallel w the conductors, as and for the purposes set forth.

2. The link for splicing the lengths of the conductor, as above specified.

WILLIAM H. HORSTMANN.

Witnesses:

HENRY C. DART,
J. J. GREENOUGH.